(12) United States Patent
Pita-Szczesniewski (10) Patent No.: US 7,937,970 B2
(45) Date of Patent: May 10, 2011

(54) METHOD FOR PREPARING PRE-REACTED RAW MATERIAL BATCHES FOR THE PRODUCTION OF SYNTHETIC SILICATES

(75) Inventor: Antonio Pita-Szczesniewski, Fribourg (CH)

(73) Assignee: Vitro Europa, Ltd., Givisiez (CH)

( * ) Notice: Subject to any disclaimer, the term of this patent is extended or adjusted under 35 U.S.C. 154(b) by 75 days.

(21) Appl. No.: 10/526,103

(22) PCT Filed: Aug. 29, 2003

(86) PCT No.: PCT/IB03/04705
§ 371 (c)(1),
(2), (4) Date: Jan. 12, 2006

(87) PCT Pub. No.: WO2004/020354
PCT Pub. Date: Mar. 11, 2004

(65) Prior Publication Data
US 2006/0101855 A1    May 18, 2006

(30) Foreign Application Priority Data
Aug. 30, 2002   (MX) .................. NL/A/2002/000026

(51) Int. Cl.
*C03B 29/00*   (2006.01)
(52) U.S. Cl. ................. 65/270; 501/27; 501/31

(58) Field of Classification Search ............... 65/27
See application file for complete search history.

(56) References Cited

U.S. PATENT DOCUMENTS

| | | | | |
|---|---|---|---|---|
| 2,114,545 | A | * | 4/1938 | Slayter ............. 65/21.1 |
| 2,220,750 | A | * | 11/1940 | Bair et al. ............ 65/31 |
| 3,082,102 | A | | 3/1963 | Cole et al. |
| 4,920,080 | A | | 4/1990 | Demarest, Jr. |
| 6,358,870 | B1 | | 3/2002 | Szczesniewski et al. |

FOREIGN PATENT DOCUMENTS
WO    WO 9933765    8/1999

* cited by examiner

*Primary Examiner* — Richard Crispino
*Assistant Examiner* — Phu H Nguyen
(74) *Attorney, Agent, or Firm* — Abelman, Frayne & Schwab (57) ABSTRACT

A method for preparing pre-reacted synthetic batches, with a low content of carbon dioxide, for the production of glass formulas, which comprises mixing stoichiometric amounts of substances, containing molecular systems of silica-sodium, silica-sodium-calcium, silica-sodium-magnesium, silica-calcium-magnesium, silica-sodium-calcium-magnesium and mixtures thereof, having reaction temperatures which do not form a liquid phase, that are selected from invariant points or from points on a line connecting invariant points of phase diagrams of said molecular systems, to complete a desired molecular formula; adding cullet to the mixture; and calcining the mixture to a reaction temperature which do not form a liquid phase and wherein the $CO_2$ is liberated.

2 Claims, 8 Drawing Sheets

FIGURA 1

FIGURA 2

FIGURA 3

FIGURA 4

FIGURA 5

FIGURA 6

FIGURA 7

FIGURA 8

METHOD FOR PREPARING PRE-REACTED RAW MATERIAL BATCHES FOR THE PRODUCTION OF SYNTHETIC SILICATES

BACKGROUND OF THE INVENTION

A. Field of the Invention

This invention relates to batches of raw materials for preparing glass and more specifically to a method for preparing pre reacted batches of raw materials for the production of glass formulas, to which were added cullet (bits of recycling glass) to increase the velocity of the calcination process, the decarbonization grade of the batch and the formation of the desirable cristaline structures.

B. Description of the Related Art

The batches for preparing molten glass have been provided, since many years, by feeding independent glass components typically silica, sodium carbonate, calcium carbonate, borates, feldspar, dolomite, kaolin, etc., in proportions according, to a desired glass formulation, to a melting furnace at temperatures ranging between 1400 to 1600° C.

These typical batches include raw materials having different melting points and reacting at different temperatures under different operating conditions.

During the melting process of the raw materials, many different reactions take place in the glass melting furnace, which producing gaseous emissions in the form of bubbles which create the need for establishing a refining and conditioning zone for the molten glass mass in the furnace which, in turn, results in a limitatior of the residence time of the molten mass, resulting in high melting temperatures and the need to carefully control environmental emission restrictions.

Additionally, because of the high temperatures and corrosive nature of the diverse types of reactions taking place in the melting furnace, the life of the melting furnace is always an important issue.

The U.S. Pat. No. 3,082,102 issued to Cole et al, discloses a process for producing molten glass by maintaining the glass batch at a temperature and for a time sufficient to complete chemical reaction between component particles while the batch as a whole remains in solid state at the completion of the reaction, before subjecting the embryo glass so formed to a temperature high enough to melt the embryo glass.

The U.S. Pat. No. 4,920,080 issued to Demarsest, discloses a method for pre-heating and pre-reacting all portions of the batch prior to the melting step, in two separate portions, a first portion of $SiO_2$ with $Na_2CO_3$ in a first pre-reaction zone at sufficient time and temperature to form a product consisting predominantly of sodium silicate, and heating a second portion of $SiO_2$ with $CaCO_3$ in a second pre-reaction zone at sufficient time and temperature to render the calcium source free of carbonates.

It can be concluded from the methods disclosed in the above mentioned patents that efforts have been made to provide pre-reacted raw materials in which gaseous compounds have advantageously been eliminated.

However, the above disclosed methods treat all the batch mixtures at temperatures finely controlled to avoid that the reactions taking place do not form a liquid melting phase because of the danger representing the difficulty of handling a batch including solid and liquid phases.

In the U.S. Pat. No. 6,358,870 issued to Antonio Pita and Hugo Bolio, and its corresponding Mexican patent application No. NL/a/2001/000043, is mentioned that a batch for the different purposes, mainly for flat glass, container glass (soda-lime and boro-silicate glass), glass fiber, etc., consists of a molecular formula comprising a diverse number of molecules of Si, Na, Ca, Mg, Bo, etc., which can be clearly approximated from natural, substances, partially treated minerals or intermediate products of treated minerals, including molecular systems of Si—Na, Si—Na—Ca, Si—Na—Mg, Si—Ca—Mg, Si—Na—Ca—Mg and mixtures thereof, some of which are in the form of already pre-reacted substances and some of which have to be conveniently pre-reacted in a calcining burner and, in either case, they are substantially free from gaseous carbon dioxide.

Also is described that, if phase diagrams are prepared for the different molecular systems of raw materials, it is possible to select molecular formulas having decomposing and/or melting temperatures well above at least 1000° C., below which not only melting glass or liquid phase is not formed, but also the release of carbon dioxide can be clearly carried out, which are selected from invariant points or from points on a line connecting invariant points of phase diagrams of said molecular systems, and combine them to reach or approach the desired molecular glass formula, completing this by adding pure silica when necessary.

Also is commented that some of the mentioned of the phase diagrams of the above disclosed nature can be found for example in the papers of K. A. Shahid & F. P. Glosser "Phase equilibrium in the glass forming region of the system $Na_2O$—$CaO$—$MgO$—$SiO_2$" published in Physics and Chemistry of Glasses Vol. 13 No. 2 April 1972; and of G. W. Morey and N. L. Bowen, "Corner of system $Na_2O$—$CaO$—$SiO_2$" published by the Soc. Glass Technol., 9 pp. 232, 233 (1925).

Said patent comment that, the those that it is looked for, is to saturate the sodium, calcium and in general all the elements of a glass formula that are handled with raw materials containing $CO_2$, to provide the specific molecular glass formula or at least a best approach of the molecular formula, completing the balance by providing silica sand In this way, it is possible to provide a pre-reacted batch of raw materials for a specific molecular glass formula which:
1. Is greatly stable;
2. Melts faster and better;
3. Does not produce any bubbles due to the decomposition of the $CO_2$ components contained in the traditionally used raw material;
4. Reacts or melts at above 1000° C.
5. Is prepared by heating typical raw materials and reacting them as a solid-solid mixture which is de-carbonated between 840° C. and 870° C.:
6. Allows the possibility of improving the glass quality and/or increasing the production rate and or reducing thermal input as well as reducing temperature conditions in the furnace.
7. Allows the possibility of reducing environmental emissions.
8. Allows the possibility of increasing furnace life and/or reducing the size of the furnace for previously equal throughputs.

The inventor of the present invention have now found that, if cullet is added in the formulation, in bulk form or forming binders, the following advantages were surprisingly found:
1. The velocity of the calcination process is surprisingly increased.
2. The decarbonization grade of the mixture is increased to the double, that when cullet is not being used.
3. A significative impact in the formation of the desirable cristaline structures is presented, since that its use, permits the formation of, in a great part of, calcium and sodium silicate ($Na_2CaSi_3O_9$).

The advantages above cited were tested by means of "X" rays diffraction analysis, which were realized on test samples that were carried out in three campaigns.

The mechanism through which the cullet permits the improvements above mentioned, in the process, is not of all known, but this could be explained due to that a better heat transfer of the cullet toward the reactives that are agglomerated in the briquettes that is being formed with the formulations, which allows a better heat diffusion, permitting the formation of the searched species, accelerating the solid-solid reaction.

SUMMARY OF THE INVENTION

It is therefore a main object of the present invention, to provide a new method for preparing pre-reacted batches of raw materials for the production of glass formulas, which comprises to add cullet, before to be subjected to calcinations, to stoichiometric amounts of substances containing molecular systems of silica-sodium, silica-sodium-calcium, silica-sodium-magnesium, silica-calcium-magnesium, silica-sodium-calcium-magnesium and mixtures thereof having reaction temperatures which do not form a liquid phase, which are selected from invariant points or from points on a line connecting invariant points of phase diagrams of said molecular systems, to complete or approach a desired molecular glass formula.

It is also a main object of the present invention, to provide a method for preparing pre-reacted batches of raw materials for the production of glass formulas, of the above disclosed nature, which add cullet to the batches before to be subjected to a calcinations process, increasing surprisingly the velocity of the calcination process, It is still a main object of the present invention, to provide a method for preparing pre-reacted batches of raw materials for the production of glass formulas, of the above disclosed nature, in which, when the cullet is added to the batches, before to be subjected to calcination, the decarbonization grade of the mixture is increased to the double, that when cullet is not being used.

It is a further main object of the present invention, to provide a method for preparing pre-reacted batches of raw materials for the production of glass formulas, of the above disclosed nature, in which, by the adding of selected amounts of cullet, before to be subjected to calcination, a significative impact in the formation of the desirable cristaline structures is presented, since that its use, permits the formation of, in a great part of, calcium and sodium silicate.

These and other objects and advantages of the method for preparing pre-reacted batches of raw materials for the production of glass formulas, of the present invention will become apparent from the following detailed description of the invention, provided as specific embodiments thereof.

BRIEF DESCRIPTION OF THE DRAWINGS

The FIGS. 1 through 8 are diagrams of the residence time against the kiln temperature and the $CO_2$ content of the test carried out with the following molecular systems: Na—Ca-5Si; Na—Ca-5Si (foundry silica); Na—Mg-4Si; Na—Mg-4Si (foundry silica); Na-3Ca-6Si; Na-3Ca-6Si (foundry silica); Na-3Ca-6Si (foundry silica); and Na-2Ca-3Si.

DETAILED DESCRIPTION OF THE INVENTION

In its most general aspect, the method for preparing pre-reacted batches of raw materials for the production of glass formulas, comprising:

mixing stoichiometric amounts of substances selected from natural minerals, partially treated minerals or intermediate products therefrom containing molecular systems of silica-sodium, silica-sodium-calcium, silica-sodium-magnesium, silica-calcium-magnesium, silica-sodium-calcium-magnesium and mixtures thereof having reaction and $CO_2$ release temperatures under 1000° C., which do not form a liquid phase at such temperatures, which were selected from invariant points or from points on a line connecting invariant points of phase diagrams of said molecular systems, to complete or approach to a desired molecular glass formula;

adding selected amounts of cullet to the batch;

calcining the batch to obtain the pre-reacted batches of raw materials for use in glass formulas.

For convenience, the mixture that was prepared with the adding cullet is subjected to agglomeration to form briquettes, which are subjected at a later time to a calcination process.

The selection of the molecular systems from invariant points in the phase diagrams were taken on the basis of the desired molecular glass formula as follows:

| | |
|---|---|
| 1. Molecular System Si—Na: | SiNa |
| 2. Molecular System Si—Na—Ca: | $Si_3Na_2Ca_2$ |
| | $Si_3NaCa_2$ |
| | $Si_6NaCa_3$ |
| | $Si_5NaCa$ |
| 3. Molecular System Si—Na—Mg | $Si_{12}NaMg_5$ |
| | $Si_6NaMg_2$ |
| | $Si_4NaMg$ |
| | $Si_6NaMg$ |

For a molecular flat glass formula comprising $Si_{73}Na_{15}Ca_9Mg_4$, the molecular systems selected were:

$4(Si_4NaMg) = 16Si - 4Na - 4Mg;$   $4(Si_6NaMg) = 24Si - 4Na - 4Mg$ $3(Si_6NaCa_3) = 18Si - 3Na - 9Ca$   $3(Si_6NaCa_3) = 18Si - 3Na - 9Ca$ $8(SiNa) = \dfrac{8Si - 8Na}{42Si - 15Na - 4Mg - 9Ca}$   $8(SiNa) = \dfrac{8Si - 8Na}{54Si - 15Na - 4Mg - 9Ca}$ The balance $\dfrac{31Si}{73Si - 15Na - 4Mg - 9Ca}$   The balance $\dfrac{19Si}{73Si - 15Na - 4Mg - 9Ca}$ For a molecular silica-lime glass container formula comprising $Si_{73}Na_{15}Ca_6$, the molecular systems selected were:

$$3(Si_6NaCa_3) = 18Si - 3Na - 9Ca \qquad 9(Si_5NaCa) = 45Si - 9Na - 9Ca$$

$$12(SiNa) = \frac{12Si - 12Na}{30Si - 15Na - 9Ca} \qquad 6(SiNa) = \frac{6Si - 6Na}{51Si - 15Na - 9Ca}$$

$$\text{The balance } \frac{43Si}{73Si - 15Na - 9Ca} \qquad \text{The balance } \frac{22Si}{73Si - 15Na - 9Ca}$$

For the selection of the desired molecular systems, firstly Differential Test Analysis (DTA) and Thermal Gravimetric Analysis were carried out in order to verify that the decarbonating temperature and the fact that the reaction temperature of the total selected batch were under the melting temperature.

In a second step, tests were conducted in a batch calcining kiln in which 10 different compounds were processed, extracting samples of each compound every 5 minutes analyzing the $CO_2$ content of half of the samples and analyzing the characteristic of the other half of the samples by means of an X ray diffraction apparatus and from the results, the three most important compounds for the glass formulations were selected.

In a third step, tests were conducted in a pilot calcining kiln, producing 2 tons of pre-decomposed and pre-reacted compounds during 48 hours, extracting samples each 30 minutes, analizing the $CO_2$ content of a half of the samples and analyzing the characteristics of the other half of samples by means of an X ray diffraction apparatus.

An last but not least, in a fourth step, industrial tests were carried out by producing 850 tons of a soda-lime-magnesium compounds in an industrial rotary kiln mixing it with the balancing raw materials required to form a glass batch formula and introducing the same in a 110 tons per day glass furnace without increasing the production rate, the following results were obtained during a test that run continuously for 11 days:

|  | TYPICAL | INVENTION | DIFFERENCE |
|---|---|---|---|
| THERMS | 92 | 77 | 15 |
| CROWN TEMPERATURE | 1470° C. | 1420° C. | 50° C. |
| GLASS TEMPERATURE (AT THE FURNACE EXIT) | 1170° C. | 1105° C. | 65° C. |
| PARTICLE EMISSION (Kg/Ton) | 0.04 | 0.0 | 0.04 |
| NOx (Kg/Ton) | 7.12 | 3.72 | 3.40 |

The furnace life was estimated to increase at least one year.

The specific Examples for tests of the second step, extracting samples of each compound every 5 minutes analyzing the $CO_2$ content in the diverse molecular systems for molecular glass formulations, which were respectively plotted in the diagrams of FIGS. 1 to 8, where:

EXAMPLE 1

Figure 1:
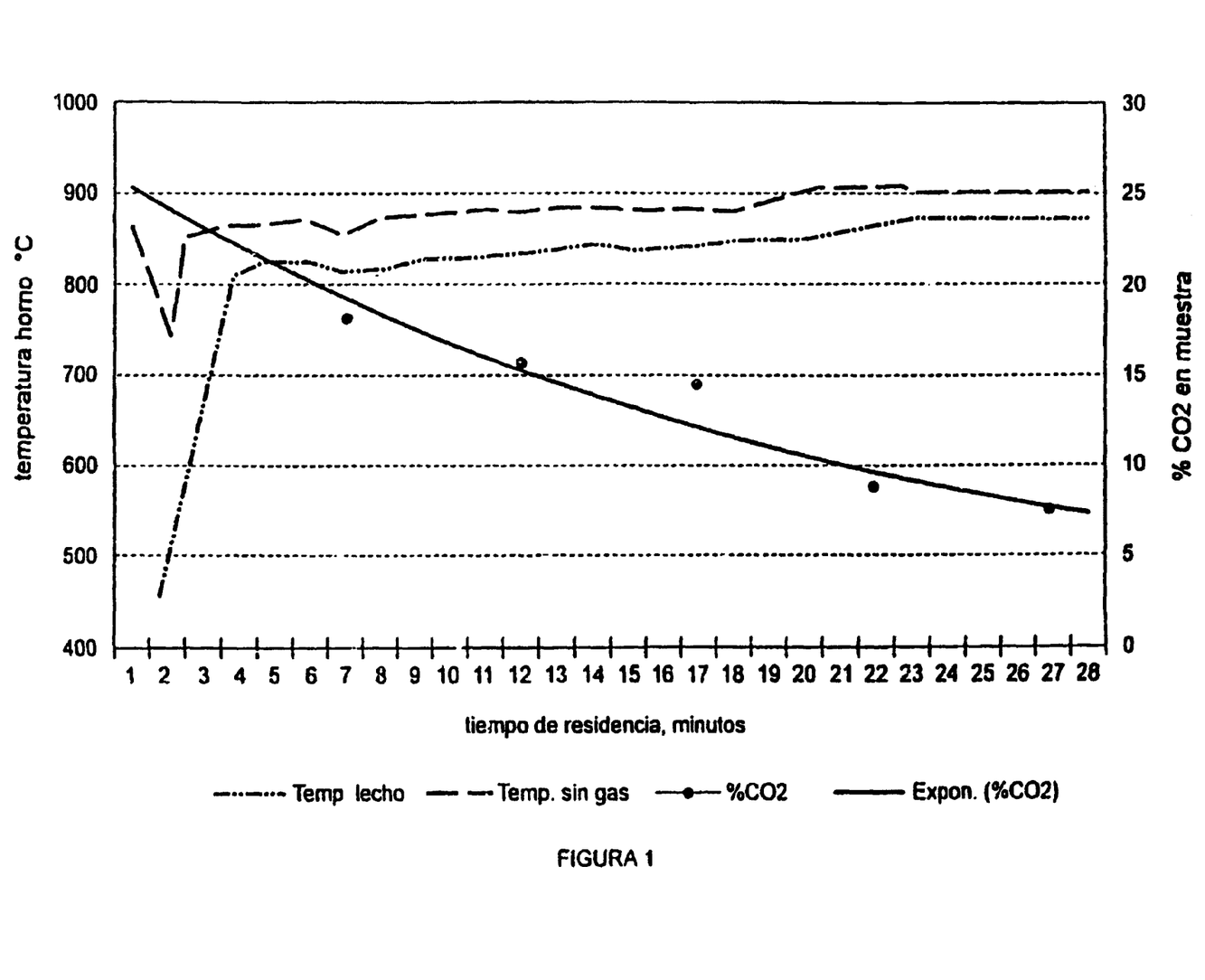

For a molecular system comprising Na—Ca-5Si three samples were extracted and analyzed, obtaining the following results illustrated in FIG. 1

| Sample # | Min. | Initial lecture | Final Lecture | Inictial-Final | Factor | % $CaCO_3$ | Factor | % $CO_2$ |
|---|---|---|---|---|---|---|---|---|
| 2 | 5 | 94.4 | 48.2 | 46.2 | 1.1 | 50.82 | 0.43 | 21.85 |
| 4 | 15 | 53.4 | 34.6 | 18.8 | 1.1 | 20.68 | 0.43 | 8.89 |
| 6 | 25 | 56.8 | 44.2 | 12.6 | 1.1 | 13.86 | 0.43 | 5.96 |

EXAMPLE 2

Figure 2:
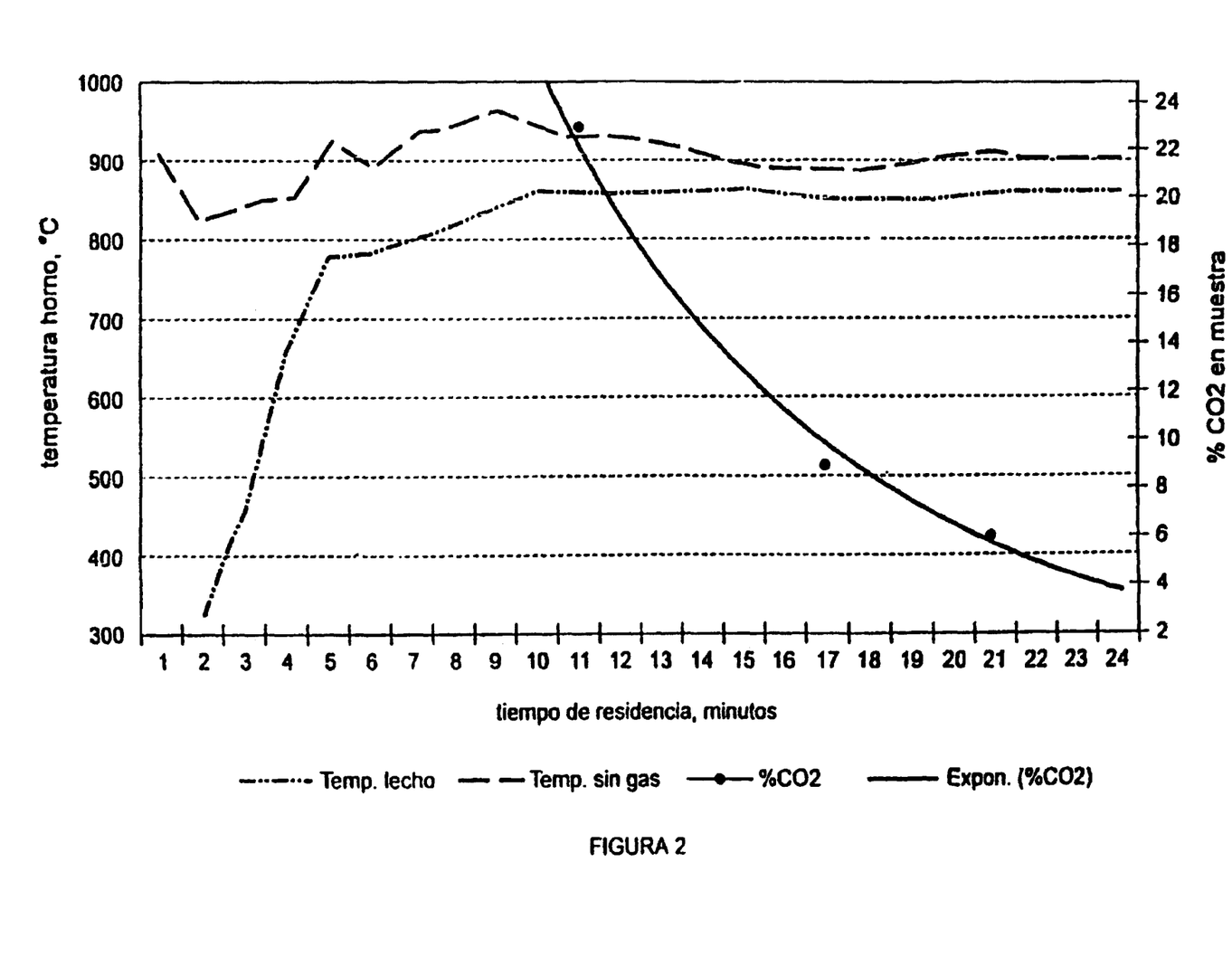

For a molecular system comprising Na—Ca-5Si (foundry silica), four samples were extracted and analyzed, obtaining the following results, illustrated in FIG. 2:

| Sample # | Min. | Initial Lecture | Final Lecture | Initial-Final | Factor | % $CaCO_3$ | Factor | % $CO_2$ |
|---|---|---|---|---|---|---|---|---|
| 2 | 5 | 61.2 | 42.0 | 19.2 | 1.1 | 21.12 | 0.43 | 9.08 |
| 4 | 15 | 56.4 | 47.4 | 9.0 | 1.1 | 9.90 | 0.43 | 4.26 |
| 6 | 25 | 46.0 | 43.2 | 2.8 | 1.1 | 3.08 | 0.43 | 1.32 |
| 8 | 35 | 46.0 | 43.8 | 2.2 | 1.1 | 2.42 | 0.43 | 1.04 |

EXAMPLE 3

Figure 3:
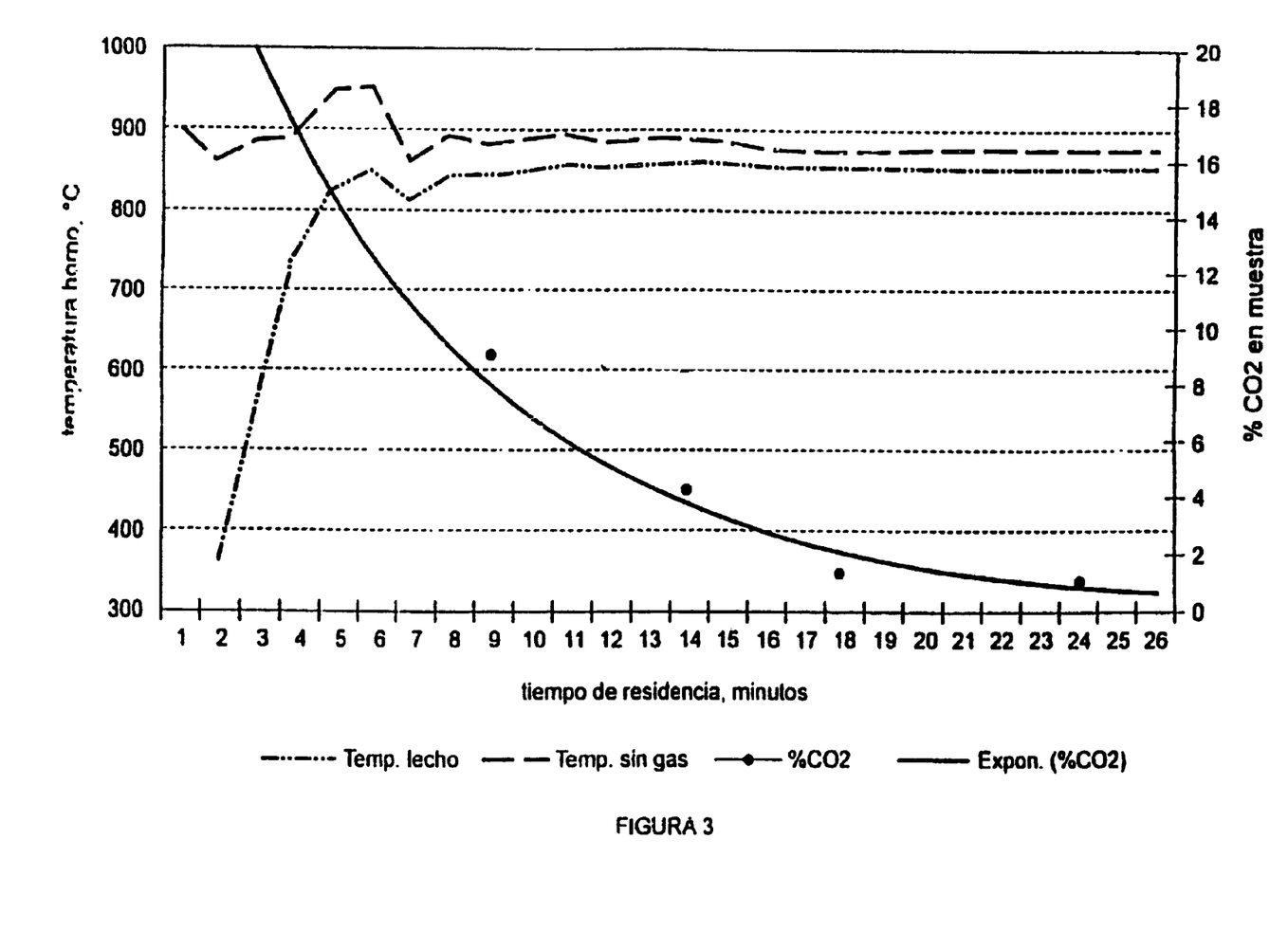

For a molecular system comprising Na—Mg-4Si, seven samples were extracted and analyzed, obtaining the following results, illustrated in FIG. 3:

| Sample # | Min. | Initial Lecture | Final Lecturel | Initial-Final | Factor | % CaCO$_3$ | Factor | % CO$_2$ |
|---|---|---|---|---|---|---|---|---|
| 1 | 0  | 52.6 | 41.8 | 10.8 | 1.1 | 11.88 | 0.43 | 5.11 |
| 2 | 5  | 44.8 | 41.6 | 3.2  | 1.1 | 3.52  | 0.43 | 1.51 |
| 3 | 10 | 37.8 | 35.0 | 2.8  | 1.1 | 3.08  | 0.43 | 1.32 |
| 4 | 15 | 44.6 | 41.6 | 3.0  | 1.1 | 3.30  | 0.43 | 1.42 |
| 5 | 20 | 45.6 | 42.2 | 3.4  | 1.1 | 3.74  | 0.43 | 1.61 |
| 6 | 25 | 32.4 | 31.4 | 1.0  | 1.1 | 1.10  | 0.43 | 0.47 |
| 7 | 30 | 47.4 | 45.4 | 2.0  | 1.1 | 2.20  | 0.43 | 0.95 |

EXAMPLE 4

Figure 4:
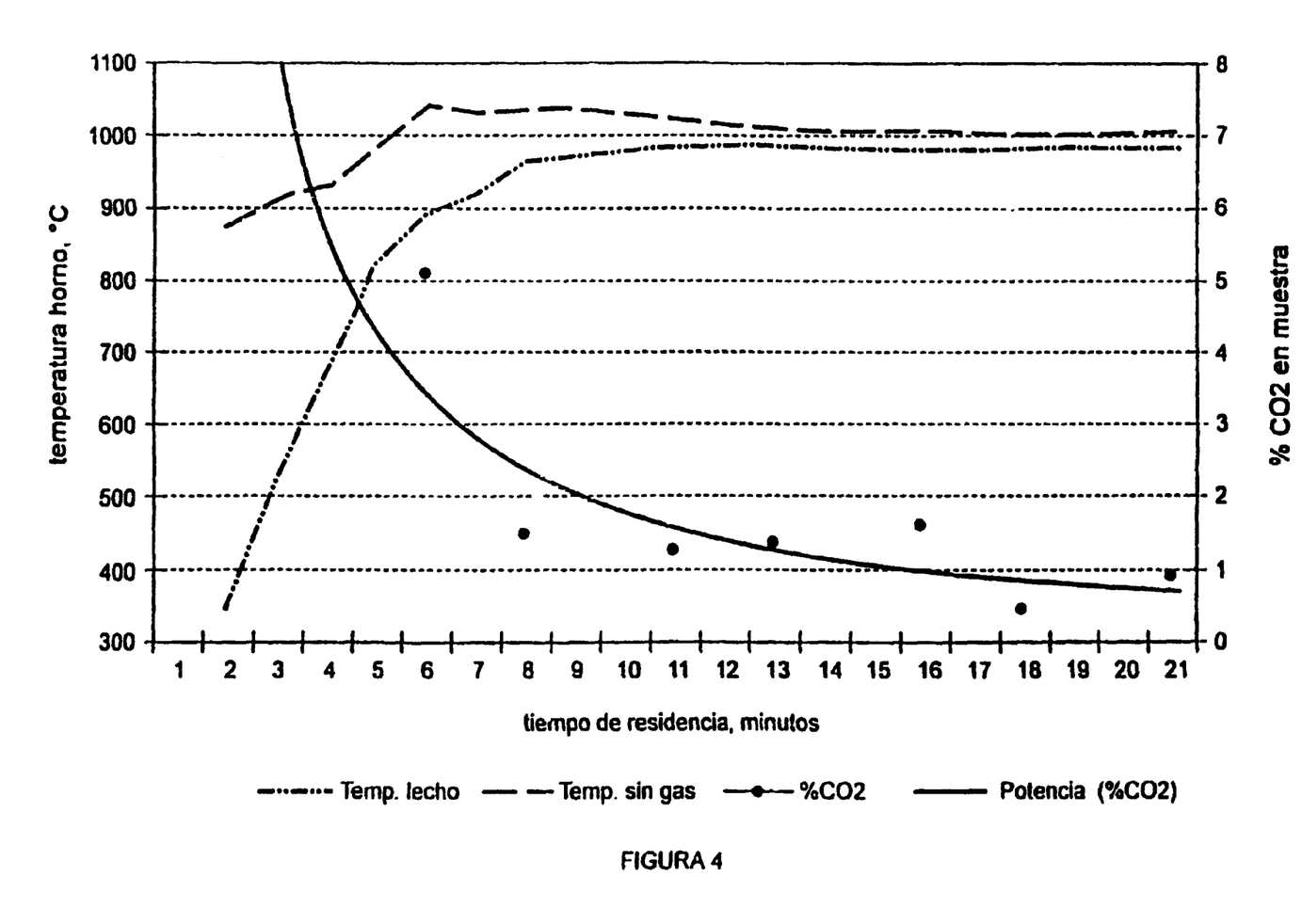

For a molecular system comprising Na—Mg-4Si (foundry silica), nine samples were extracted and analyzed, obtaining the following results illustrated in FIG. 4.

| Muestra # | Min. | Lectura Inicial | Lectura Final | Inicial-Final | Factor | % CaCO$_3$ | Factor | % CO$_2$ |
|---|---|---|---|---|---|---|---|---|
| 1 | 0  | 57.8 | 42.8  | 15.00 | 1.1 | 16.50 | 0.43 | 7.10 |
| 2 | 5  | 64.0 | 44.0  | 20.00 | 1.1 | 22.00 | 0.43 | 9.46 |
| 3 | 10 | 56.4 | 45.8  | 10.60 | 1.1 | 11.66 | 0.43 | 5.01 |
| 4 | 15 | 51.8 | 45.2  | 6.60  | 1.1 | 7.26  | 0.43 | 3.12 |
| 5 | 20 | 45.4 | 43.2  | 2.20  | 1.1 | 2.42  | 0.43 | 1.04 |
| 6 | 25 | 41.8 | 37.8  | 4.00  | 1.1 | 4.40  | 0.43 | 1.89 |
| 7 | 30 | 45.8 | 3.40  | 3.40  | 1.1 | 3.74  | 0.43 | 1.61 |
| 8 | 35 | 46.0 | 3.24  | 3.20  | 1.1 | 3.52  | 0.43 | 1.51 |
| 9 | 40 | 36.8 | 436.4 | 4.00  | 1.1 | 4.40  | 0.43 | 1.89 |

EXAMPLE 5

Figure 5:
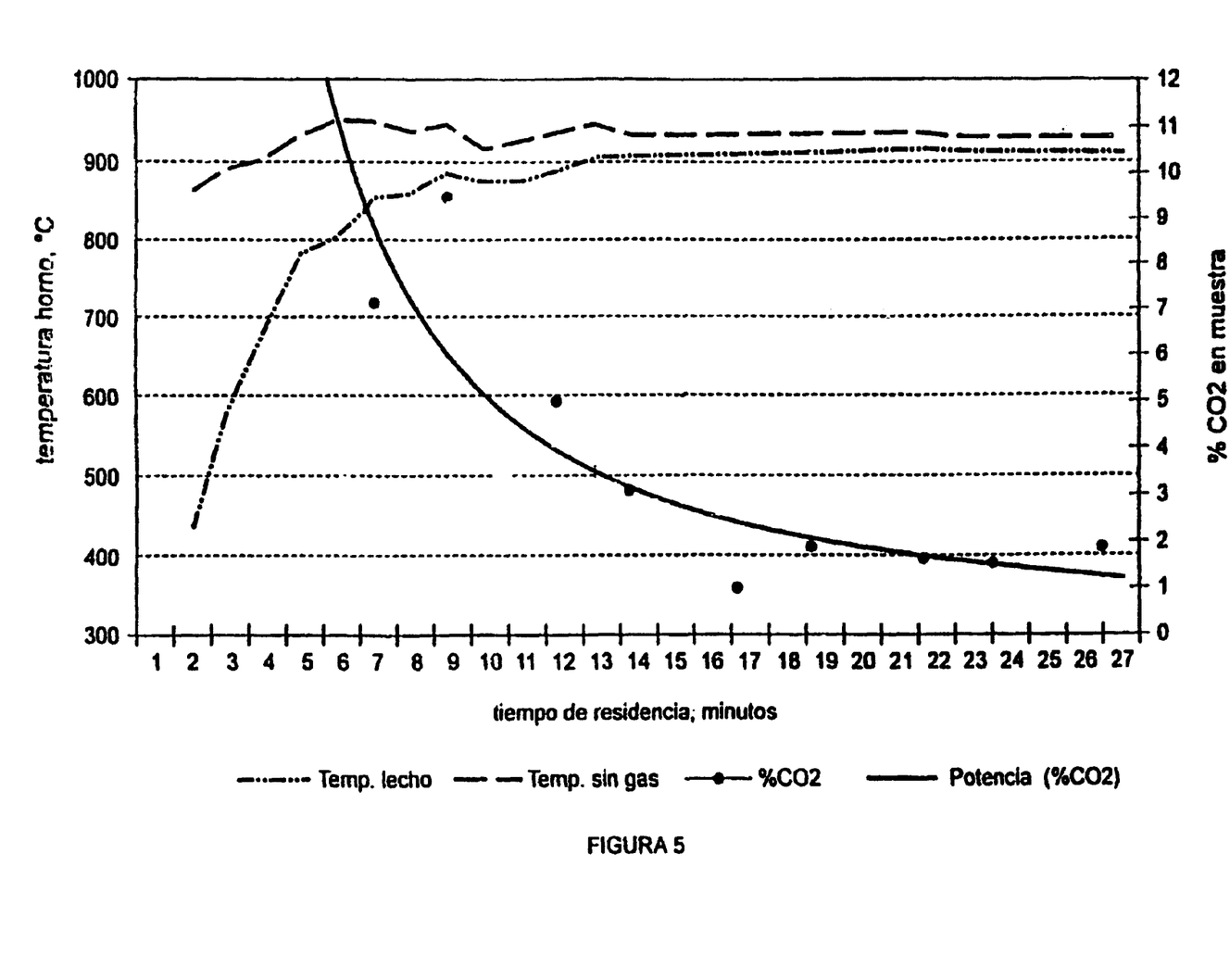

For a molecular system comprising Na-3Ca-6Si, nine samples were extracted and analyzed, obtaining the following results, illustrated in FIG. 5:

| Sample # | Min. | Initial Lecture | Final Lecture | Initial-Final | Factor | % CaCO$_3$ | Factor | % CO$_2$ |
|---|---|---|---|---|---|---|---|---|
| 1 | 5  | 52.4 | 42.4 | 10.0 | 1.1 | 11.00 | 0.43 | 4.73 |
| 2 | 10 | 42.2 | 35.6 | 6.6  | 1.1 | 7.26  | 0.43 | 3.12 |
| 3 | 15 | 48.8 | 46.0 | 2.8  | 1.1 | 3.08  | 0.43 | 1.32 |
| 4 | 20 | 44.6 | 42.4 | 2.2  | 1.1 | 2.42  | 0.43 | 1.04 |
| 5 | 25 | 45.6 | 43.6 | 2.0  | 1.1 | 2.20  | 0.43 | 0.95 |
| 6 | 30 | 41.8 | 39.8 | 2.0  | 1.1 | 2.20  | 0.43 | 0.95 |
| 7 | 35 | 37.6 | 36.0 | 1.6  | 1.1 | 1.76  | 0.43 | 0.76 |
| 8 | 40 | 47.6 | 45.4 | 2.2  | 1.1 | 2.42  | 0.43 | 1.04 |
| 9 | 45 | 42.4 | 40.4 | 2.0  | 1.1 | 2.20  | 0.43 | 0.95 |

EXAMPLE 6

Figure 6:
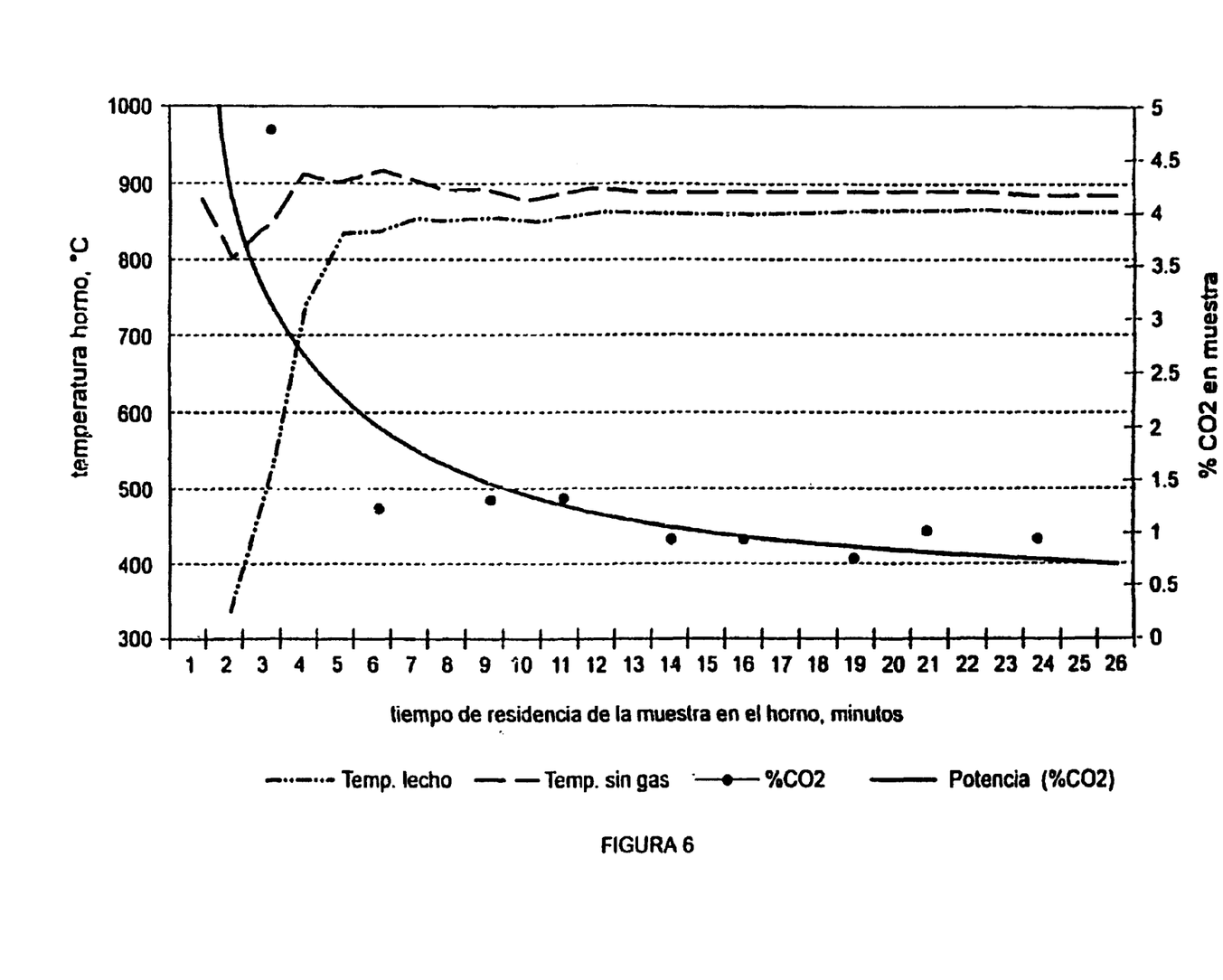

For a molecular system comprising Na-3Ca-6Si (foundry silica), eleven samples were extracted and analyzed, obtaining the following results, illustrated in FIG. 6:

| Sample # | Min. | Initial Lecture | Final Lecture | Initial-Final | Factor | % $CaCO_3$ | Factor | % $CO_2$ |
|---|---|---|---|---|---|---|---|---|
| 1 | 0 | 94.0 | 41.2 | 52.8 | 1.1 | 50.8 | 0.43 | 24.97 |
| 2 | 5 | 72.6 | 36.4 | 36.2 | 1.1 | 39.82 | 0.43 | 17.12 |
| 3 | 10 | 62.2 | 39.8 | 22.4 | 1.1 | 24.64 | 0.43 | 10.60 |
| 4 | 15 | 49.8 | 40.4 | 9.4 | 1.1 | 10.34 | 0.43 | 4.45 |
| 5 | 20 | 44.8 | 39.0 | 5.8 | 1.1 | 6.38 | 0.43 | 2.74 |
| 6 | 25 | 45.0 | 40.4 | 4.6 | 1.1 | 5.06 | 0.43 | 2.18 |
| 7 | 30 | 45.2 | 40.6 | 4.6 | 1.1 | 5.06 | 0.43 | 2.18 |
| 8 | 35 | 49.0 | 44.8 | 4.2 | 1.1 | 4.62 | 0.43 | 1.99 |
| 9 | 40 | 47.6 | 43.0 | 4.6 | 1.1 | 5.08 | 0.43 | 2.18 |
| 10 | 45 | 46.6 | 43.0 | 3.6 | 1.1 | 3.96 | 0.43 | 1.70 |
| 11 | 50 | 46.0 | 42.6 | 3.4 | 1.1 | 3.74 | 0.43 | 1.61 |

EXAMPLES 7 AND 8

Figure 7:
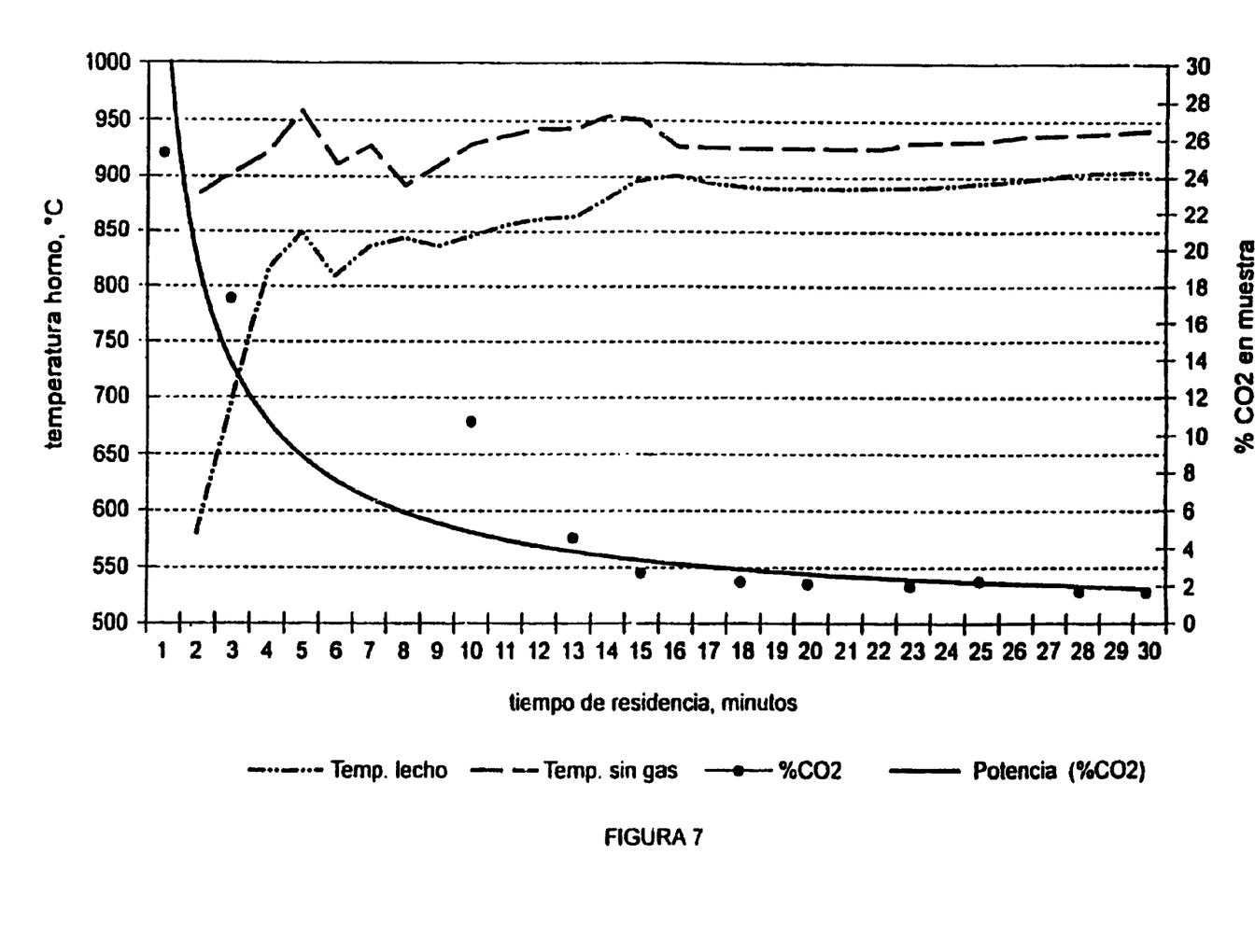
Figure 8:
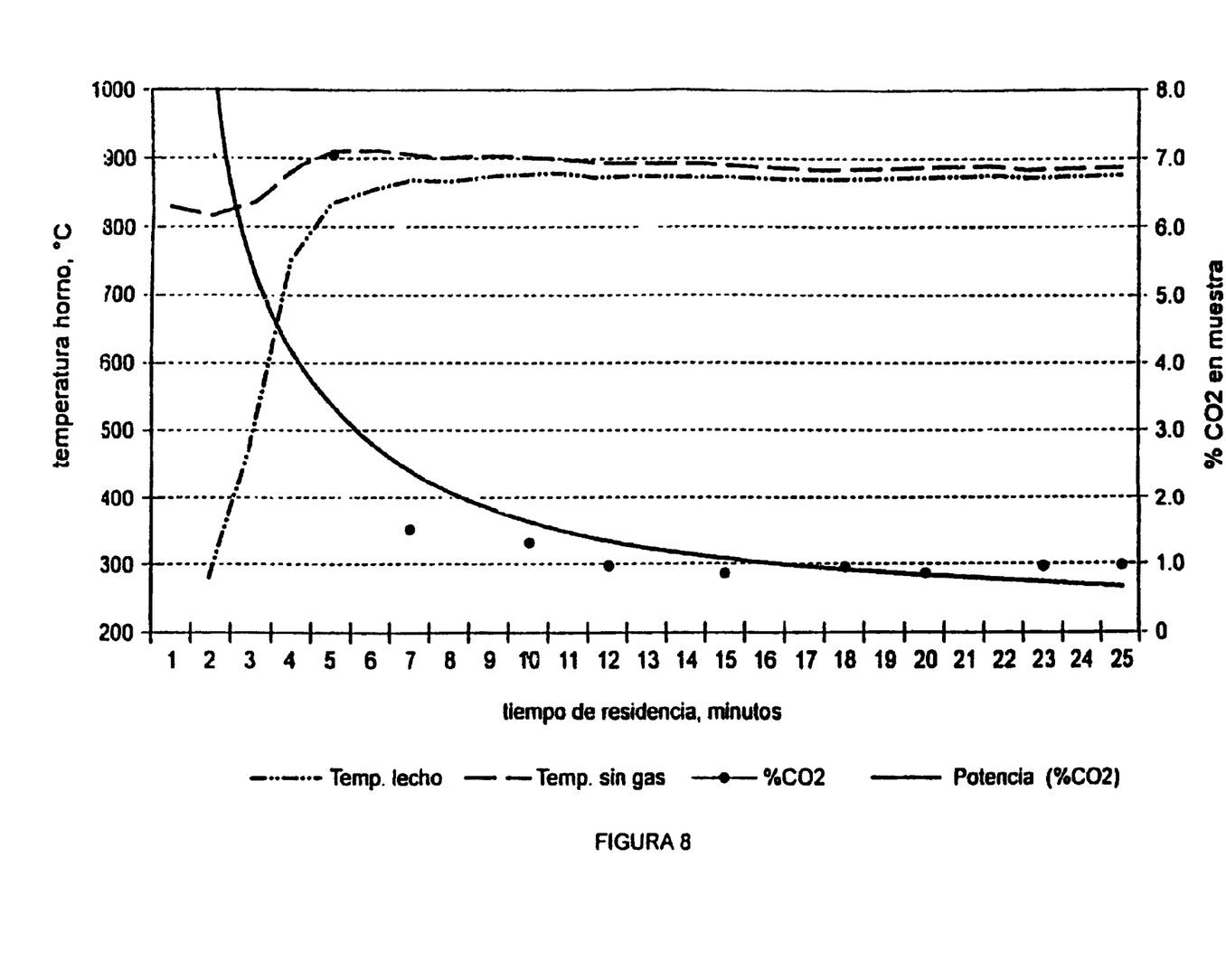

Finally, for molecular systems comprising Na-3Ca-6Si (foundry silica) and Na-2Ca-3Si, eleven and eight samples were extracted and analyzed, obtaining the results illustrated in FIGS. 7 and 8.

To confirm the effects of adding cullet to the mixture of raw materials for preparing the pre-reacted batches, three experimentation campaigns forming briquettes of raw materials, were carried out. The first ant the third without the addition of cullet and the second, in the experiment 8 and 9, for a formulation containing three parts of $SiO_2$, two parts of $Na_2O$, and one part of CaO, as well as, adding a small amount of a formulation containing three parts of SiO2, one part of $Na_2O$ and two parts of CaO (which are identified as 3:2:1+3:1:2). In this formulation a 20% by weight of cullet was approximately added, obtaining the following results:

TABLE 1

| Time to | Experiment 8 | | Experiment 9 | | Experiment 10 | | Experiment 11 | |
|---|---|---|---|---|---|---|---|---|
| Temperature | Temp ° C. | $CO_2$ % | Temp ° C. | $CO_2$ % | Temp ° C. | $CO_2$ % | Temp ° C. | $CO_2$ % |
| 75 | 877 | 0.75 | 875 | 0.55 | 875 | 5.86 | 877 | 3.24 |
| 90 | 885 | 0.78 | 875 | 0.75 | 879 | 2.75 | 885 | 2.64 |
| 105 | 893 | 0.61 | | | 875 | 3.26 | 876 | 1.66 |
| 120 | 8.73 | 0.61 | | | 879 | 2.55 | 874 | 1.12 |

TABLE 2

Chemical and mineral analysis of the glass formula 5.1.1. Campaign 1.

| | | | Experiment No. | | |
|---|---|---|---|---|---|
| | | | 1 | 2 | 3 |
| | | Ängle | Run of Briquette No. | | |
| | Name of PDF# | 2-Teta | 1 | 1 | 2 |
| $SiO_2$,% Quartz | 33-1161 | 26.6° | ~25-35% | ~25-35% | ~25-35% |
| $Na_4CaSi_3O_9$ | 37-0282 | 48.2° | Traces | Traces | Traces |
| $Na_2Ca_2Si_2O_7$ | 10-0016 | 33.0°, 49.6° | Traces | Traces | Traces |
| $Na_2CaSi_3O_8$ | 12-0671 | 48.6° | Minor | Subord. | Minor |
| CaO Cal | 37-1497 | 37.3°, 53.9° | Traces-minor | Traces-minor | Traces-minor |

The Categories are Major, Subordinate (Subord) Minor, Traces and No detected (ND).
The enunciate on the row provides the formula, name or PDF and Number and the Angle 2-Teta of the peak that was measured.

TABLE 3

Chemical and mineral analysis of the glass
formula 3.2.1 + 3.1.2 Campaign 2

| Name of | Ängle 2- | Experiment No. | | |
|---|---|---|---|---|
| | | 8 | 9 | 10 |
| | | Run of Briquette No. | | |
| PDF# | Teta | 1 | 1 | 1 |
| $SiO_2$, % Cuarzo | 33-1161 | 26.6 | ~1.3% | ~2.0% | ~5.0% |
| $Na_4CaSi_3O_9$ | 37-0282 | 33.5°, 48.2° | Major | Major | Major |
| $Na_2Ca_2Si_2O_7$ | 10-0016 | 33.0°, 49.6° | Subord. | Subord. | Subord. |
| $CaCO_3$ | 05-0586 | 29.3° | Minor | Minor | Minor |
| $Na_2CO_3$ | 37-0451 | 30.2° | ND | ND | Traces |
| CaO Cal | 37-0497 | 37.3°, 53.8° | ND | ND | ND |
| Amorphous glass | | | ND | ND | ND |

TABLA 4

Chemical and mineral analysis of the glass
formula 5.1.1 + 1.1 Campaign 3

| Name of | Ängle 2- | Experiment No. | | |
|---|---|---|---|---|
| | | 16 Prod | 17 Prod | 18 Prod |
| | | Run of Briquette No. | | |
| PDF# | Teta | 2 | 2 | 4 |
| $SiO_2$, % Quartz | 33-1161 | 26.6 | ~28% | ~34% | ~35% |
| $Na_2CaSi_3O_9$ | 37-0282 | 33.5°, 48.2° | Minor | Minor | Minor |
| $Na_2Ca_2Si_2O_7$ | 10-0016 | 33.0°, 49.6° | Traces | Traces | Minor |
| $Na_2CaSi_3O_8$ | 12-0671 | 48.6° | Minor | Minor | Minor |
| $CaCO_3$ | 05-0586 | 29.3° | Traces | ND | Traces |
| $Na_2CO_3$ | 37-0451 | 30.2° | Minor | Traces | Traces |
| CaO Cal | 37-1497 | 37.3°, 53.8° | ND | ND | Traces |
| Amorphous glass | | | ND | ND | ND |

The results of the Table 1, shows the surprisingly benefic effect that the cullet has in the velocity of the calcination process, as well as, in the decarbonization grade of the mixture (remaining with a content of between 1 and 0.5% of $CO_2$), because permits the heat penetration within the briquette of the mixture of raw materials, that is absorbed toward the centre of the briquettes, giving as result a more complete reaction of the components of the mixture. Furthermore, in the experiments 8 and 9, the levels of carbon dioxide were maintained 1% per below of the limit.

These data carrying to the inventor to define the approximately performance limits of the amounts of cullet that is useful to add to the mixture of the raw materials between un 5 y 25% by weight, and to be agglomerated before to be submitted to a calcination process.

Finally regarding to the formation grade of the desirable crystalline structures, the results of the campaign 3, for the campaign in that was used the cullet, in comparison with the results obtained in the tables 2 and 4, these shows the desirable formation of the crystalline structures $Na_4CaSi_3O_9$ y $Na_2Ca_2Si_2O_7$.

The invention claimed is:

1. A method for preparing pre-reacted synthetic batches, with a low content of carbon dioxide, for the production of synthetic silicates, comprising the steps of:

mixing raw materials, minerals, partially treated minerals or intermediate products therefrom, containing molecular systems of silica-sodium, silica-sodium-calcium, silica-sodium-magnesium, silica-calcium-magnesium, silica-sodium-calcium-magnesium and mixtures thereof, in selected stoichiometric amounts, which were selected from one or invariant points or from points on a line connecting invariant points of a phase diagram;

adding between 5 to 25% by weight of cullet to the batch of raw materials, which contains the molecular systems of silica-sodium, silica-sodium-calcium, silica-sodium-magnesium, silica-calcium-magnesium, silica-sodium-calcium-magnesium and mixtures thereof, in selected stoichiometric amounts in order to increase the velocity of the calcinations process, the decarbonization grade of the batch and the formation of the desired crystalline structures $Na_4CaSi_3O_9$ and $Na_2Ca_2Si_2O_7$; and, calcining the batch to a reaction temperature which does not form a liquid phase, wherein the $CO_2$ is liberated to produce said pre-reacted synthetic batch in order to completely saturate the sodium, sodium and calcium, or the sodium, calcium and magnesium of a molecular formula of glass, wherein the adding of cullet in the mixture is subjected to an agglomeration step, which permits heat penetration within the mixture of raw materials, that is absorbed toward the center of the mixture resulting in a more complete reaction of the components of the mixture and for more rapidly extracting the $CO_2$ from the raw materials, wherein the content of carbon dioxide in the pre-reacted synthetic batches is between 1 and 0.5%, by weight.

2. The method as claimed in claim 1, wherein briquettes are formed with the mixture of raw materials and cullet before being submitted to the calcination process.

* * * * *